(12) United States Patent
Haramoto et al.

(10) Patent No.: US 10,165,738 B2
(45) Date of Patent: Jan. 1, 2019

(54) BLOW OPERATION DEVICE

(71) Applicant: Yamabiko Corporation, Tokyo (JP)

(72) Inventors: Kunihiko Haramoto, Tokyo (JP); Kenji Suzuki, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 15/466,311

(22) Filed: Mar. 22, 2017

(65) Prior Publication Data

US 2017/0273252 A1   Sep. 28, 2017

(30) Foreign Application Priority Data

Mar. 23, 2016   (JP) ................. 2016-059081

(51) Int. Cl.
| | |
|---|---|
| *F04D 25/06* | (2006.01) |
| *F04D 27/00* | (2006.01) |
| *B08B 5/02* | (2006.01) |
| *A01G 20/43* | (2018.01) |
| *A47L 5/14* | (2006.01) |
| *E01H 1/08* | (2006.01) |

(Continued)

(52) U.S. Cl.
CPC ............ *A01G 20/43* (2018.02); *A01G 20/47* (2018.02); *A47L 5/14* (2013.01); *B08B 5/02* (2013.01); *E01H 1/0809* (2013.01); *F04D 25/0673* (2013.01); *F04D 27/004* (2013.01); *F04D 25/16* (2013.01); *F04D 29/325* (2013.01); *F04D 29/522* (2013.01); *F04D 29/545* (2013.01)

(58) Field of Classification Search
CPC ....... A01G 20/43; B08B 5/02; F04D 25/0673; F04D 27/004; F04D 25/16; F04D 29/325; F04D 29/522; F04D 29/545
See application file for complete search history.

(56) References Cited

U.S. PATENT DOCUMENTS

| | | |
|---|---|---|
| 3,643,292 A | 2/1972 | Mayer |
| 4,748,712 A | 6/1988 | DiGiovanni |

(Continued)

FOREIGN PATENT DOCUMENTS

| | | |
|---|---|---|
| EP | 2243347 A1 | 10/2010 |
| WO | 2013139371 A1 | 9/2013 |

OTHER PUBLICATIONS

Extended European Search Report for European Patent Application No. 17275032.5, dated Sep. 1, 2017, 9 pages.

(Continued)

*Primary Examiner* — Dung Van Nguyen
(74) *Attorney, Agent, or Firm* — Withrow & Terranova, PLLC

(57) ABSTRACT

To reduce fatigue in the arm of an operator of a blow operation device driven by an electric motor and to realize a blow operation of blowing and gathering generated compressed air from both the right and left with a small operational burden. A blow operation device includes a backpack type frame, a battery attached to the frame, a blower body having an electric motor to which power is fed from the battery and having an axial fan driven by the electric motor, and a blower tube connected to a blow side of the blower body, the frame including a back contact surface, and the blower body being attached to the frame such that axial directions of the electric motor and the axial fan are along the back contact surface.

10 Claims, 5 Drawing Sheets

(51) Int. Cl.
*A01G 20/47* (2018.01)
*F04D 25/16* (2006.01)
*F04D 29/32* (2006.01)
*F04D 29/52* (2006.01)
*F04D 29/54* (2006.01)

(56) References Cited

U.S. PATENT DOCUMENTS

| | | |
|---|---|---|
| 5,220,704 A | 6/1993 | Flynn et al. |
| 5,588,177 A * | 12/1996 | Eriksen .................. A47L 5/36 15/327.5 |
| 6,006,400 A | 12/1999 | Presenza |
| 6,105,206 A | 8/2000 | Tokumaru et al. |
| 6,295,692 B1 | 10/2001 | Shideler |
| 6,928,693 B1 | 8/2005 | Ericson |
| 7,600,290 B1 | 10/2009 | Peters |
| 8,671,516 B1 | 3/2014 | Mendez |
| 8,918,956 B2 | 12/2014 | Pellenc |
| 9,259,126 B2 * | 2/2016 | Niederman ............ A47L 5/36 |
| 9,277,844 B1 * | 3/2016 | Millan .................. A47L 5/36 |
| 2014/0115835 A1 | 5/2014 | Kolb et al. |
| 2015/0143657 A1 | 5/2015 | Gindele et al. |
| 2016/0208449 A1 | 7/2016 | Barth et al. |
| 2017/0015419 A1 | 1/2017 | Tyler et al. |
| 2017/0119132 A1 | 5/2017 | Pruess et al. |

OTHER PUBLICATIONS

Extended European Search Report for European Patent Application No. 17275033.3, dated Sep. 1, 2017, 10 pages.
Non-Final Office Action for U.S. Appl. No. 15/466,209, dated Nov. 5, 2018, 8 pages.

* cited by examiner

BLOW OPERATION DEVICE

RELATED APPLICATIONS

This application claims priority to Japanese Patent Application No. 2016-059081 filed on Mar. 23, 2016, the disclosure of which is hereby incorporated herein by reference in its entirety.

TECHNICAL FIELD

The present invention relates to a blow operation device.

BACKGROUND

A blow operation device is a work machine that discharges compressed air generated with a blower driven by a prime mover to blow and gather fallen leaves, mown grass, or the like scattered on a street or garden. Generally known ones are a handheld type and a backpack type for an operator to perform an operation while walking Patent Literature 1 below shows an electric-motor-driven blower that is made handheld, with a battery carried on one's back.

RELATED ART LITERATURE

Patent Literature

Patent Literature 1: U.S. Pat. No. 8,918,956 (Specification)

SUMMARY

Technical Problem

The demand trends for blow operation devices are shifting from engine-driven ones to electric-motor-driven ones, in consideration of environmental issues such as gas emission and noise. An electric-motor-driven blow operation device includes, as heavy objects, a battery and an electric motor. In the technique described above, the battery is a backpack type, but the blower having a heavy electric motor is held with one's hand for an operation. Therefore, a corresponding burden of heavy weight cannot be avoided.

In the conventional technique in which an operation is done while a blower portion of the blower is held with one's hand, the blower portion including the heavy electric motor and the like is supported by one arm. Since the reaction force from blowing air is added to the arm during the operation, there is a problem that fatigue in the arm increases as the operation makes progress. Particularly with a blowing-and-gathering operation by blowing air, an efficient operation can be performed by blowing and gathering generated compressed air from both the right and left. However, to realize this, the blower portion of the blower needs to be held respectively by both right and left arms to blow air from two directions, and there has been a problem that the burden on the arms of an operator further increases.

Addressing such a problem is one example of an issue of the present invention. That is, the issue of the present invention is to, for example, reduce the burden of heavy weight on an operator and further reduce fatigue in an arm of the operator, with an electric-motor-driven blow operation device.

Solution to Problem

In order to resolve such an issue, a blow operation device of the present invention is provided with at least the following configuration.

A blow operation device includes: a backpack type frame; a battery attached to the frame; a blower body having an electric motor to which power is fed from the battery and having an axial fan driven by the electric motor; and a blower tube connected to a blow side of the blower body, the frame including a back contact surface, and the blower body being attached to the frame such that axial directions of the electric motor and the axial fan are along the back contact surface.

Advantageous Effects of Invention

In such a blow operation device, the battery and the blower body are attached to the frame, and the blower body is attached along the back contact surface of the frame. Therefore, the blower body and the battery that are heavy objects can be made close to the back and carried on the back of an operator, and the burden of heavy weight on the operator can be reduced sufficiently. Since an operation is done without the heavy weight of the blower body being borne only with one's hand, fatigue in the arm of the operator can be reduced.

DESCRIPTION OF EMBODIMENTS

Figure 1:
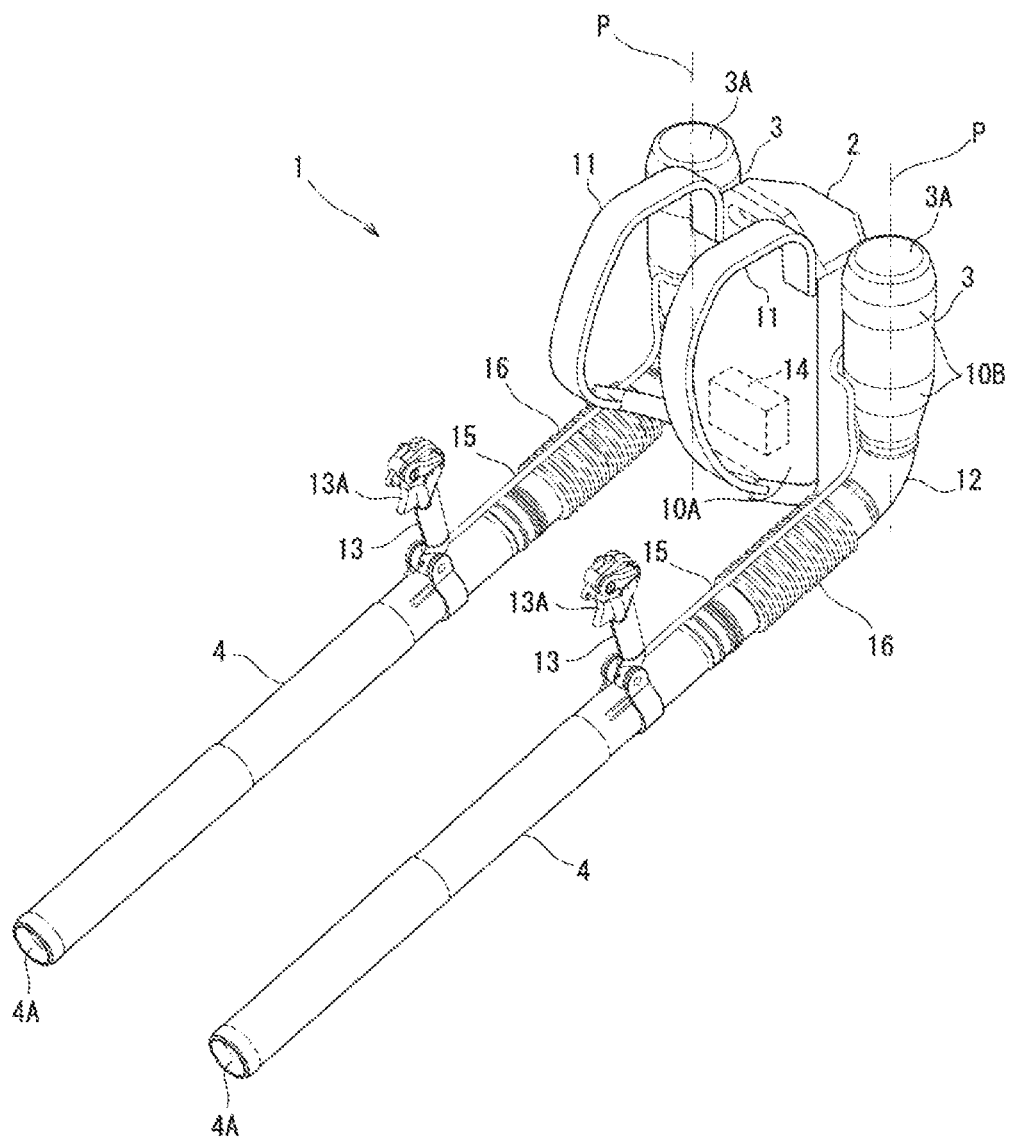
FIG. 1 is a perspective view showing the overall configuration of a blow operation device according to an embodiment of the present invention.

An embodiment of the present invention will be described below with reference to the drawings. FIG. 1, FIG. 2($a$), and FIG. 2($b$) show the overall configuration of a blow operation device 1. In the description below, an example of a two-tube type will be described. However, the blow operation device 1 according to the embodiment of the present invention is not limited to a two-tube type and may be a one-tube type in which a blower is attached to one of the right and left.

The blow operation device 1 includes a backpack type frame 10 to which a backpack harness 11 is attached, a battery 2 attached to the frame 10, a blower body 3 attached to the frame 10, and a blower tube 4. The blower body 3 and the blower tube 4 are connected via a bending hose 12 and a flexible hose 16.

The frame 10 includes a back contact surface 10A. The back contact surface 10A is a surface that contacts the back of an operator when the operator carries the frame 10 on the back. The frame 10 including the back contact surface 10A allows an operator to receive the frame 10 to which the battery 2 and the blower body 3 are attached with the back, whereby a stable carrying on the back can be performed.

Figure 3:
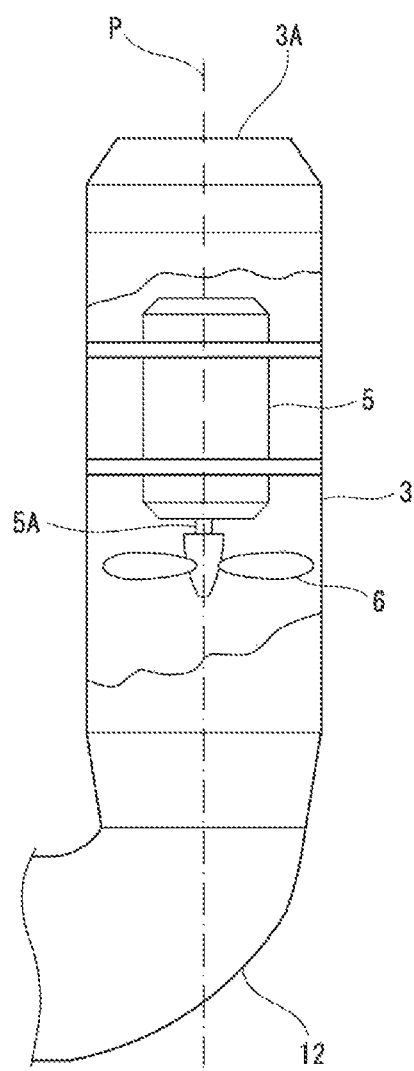
FIG. 3 is an illustrative view showing a blower body of the blow operation device according to the embodiment of the present invention.

As shown in FIG. 3, the blower body 3 has an electric motor 5 and an axial fan 6 built-in. On the tip end side of the blower body 3, the blower tube 4 mentioned above is connected via the bending hose 12 or the like. On the rear side of the blower body 3, an intake port 3A for air is provided. The electric motor 5 is connected to the battery 2 via a feed cable omitted in the drawing to be rotated and driven by power feeding from the battery 2.

Rotating and driving the axial fan 6 mounted to a drive shaft 5A of the electric motor 5 cause air to be sucked into the blower body 3 from the intake port 3A and sent to the blower tube 4. In the example shown in the drawing, the central axis of the blower body 3 is coaxial with the drive shaft 5A of the electric motor 5.

In the blow operation device 1, the blower body 3 is attached to the frame 10 by an attach member 10B, such that the direction of a drive axis P of the electric motor 5 and the axial fan 6 is along the up-down direction of the back contact surface 10A of the frame 10.

Figure 2A:
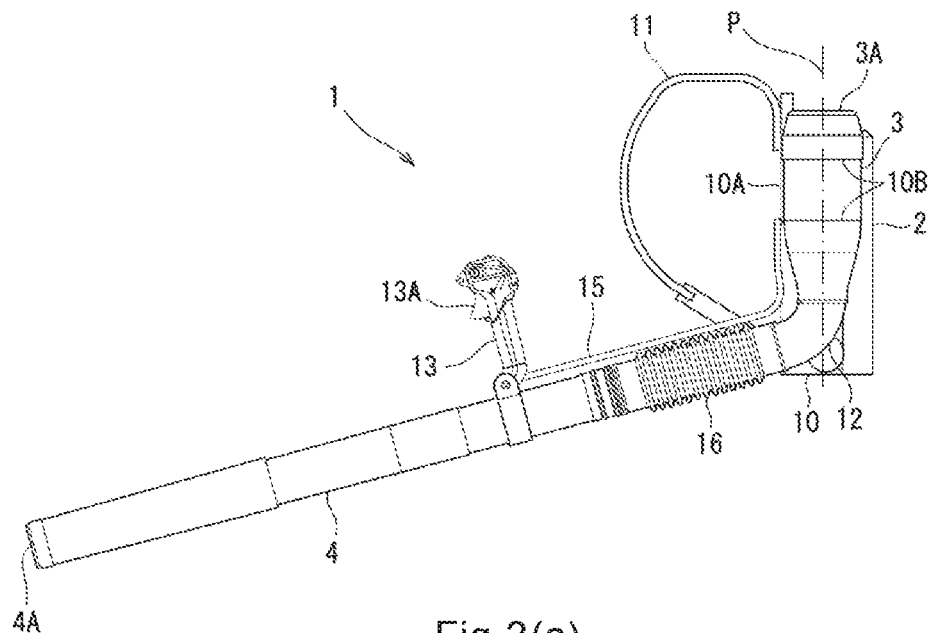
FIG. 2($a$) and FIG. 2($b$) are illustrative views showing the overall configuration of the blow operation device according to the embodiment of the present invention (FIG. 2($a$) being a side view, and FIG. 2($b$) being a plan view).
Figure 2B:
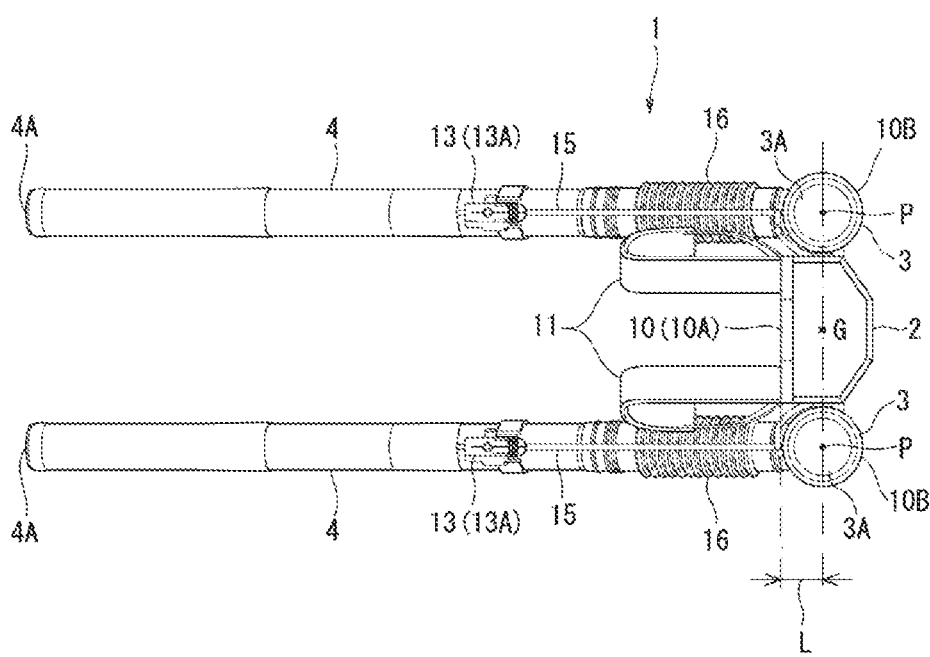

In the example shown in FIG. 1 and FIG. 2(a), the drive axis P is in the up-down direction and disposed approximately parallel to the back contact surface 10A. By attaching the blower body 3 to the frame 10 in such a disposition, the blower body 3 can be in close state to the back of an operator. Therefore, the burden of heavy weight on the operator can be reduced sufficiently. Particularly, by disposing a pair of the blower bodies 3 such that the drive axes P are parallel to each other and arranging the battery 2 therebetween as shown in the drawing, heavy objects attached to the frame 10 can all be made close to the back of an operator, and an operation can be done in a state where the burden of heavy weight carried on the back is greatly reduced. With a disposition such that a gravity center G of the battery 2 and the drive axes P of the pair of blower bodies 3 are at an identical distance L from the back contact surface 10A as shown in FIG. 2(b), the frame 10 to which the blower body 3 and the battery 2 are attached can be carried on the back of an operator with a favorable balance, and an operation can be performed comfortably.

The blower tube 4 connected to the blower body 3 via the bending hose 12 and the flexible hose 16 is provided with a grip 13 to change the blowout direction (direction of a blowout port 4A) of the blower tube 4. The grip 13 is provided with an operation input part 13A. The frame 10 is provided with a controller 14. An operation signal input by the operation input part 13A of the grip 13 is input to the controller 14 via a signal cable 15. A control signal output from the controller 14 is input to the electric motor 5 via a signal line omitted in the drawing. Accordingly, by operating the operation input part 13A, on/off and the rotation speed of the electric motor 5 can be controlled freely. In the example shown in the drawing, the controller 14 is provided to the frame 10. However, the controller 14 may be provided within the blower body 3.

An operation with such a blow operation device 1 is an operation performed while an operator is holding the grip 13 with the hand and walking, in a state where the backpack harness 11 is worn around the shoulder and the frame 10 is carried on the back. The operator changes the direction of the blowout port 4A as appropriate to perform blowing and gathering in a desired direction, by operating the grip 13 up and down and to the right and left.

With such a blow operation device 1, in a similar manner to the conventional technique, the battery 2 that is a heavy object is supported to the backpack type frame 10, and the blower body 3 is supported to the frame 10. Therefore, an operation can be performed in a state where the burden of heavy weight on the arm is reduced sufficiently. Further, the structure of the blower body 3 is such that the electric motor 5 and the axial fan 6 are combined and both disposed in proximity to the back contact surface 10A. Therefore, compared to centrifugal fan type with a direct-coupled engine, the size and weight of the blower portion and the whole can be reduced significantly.

By the blower body 3 being supported to the frame 10, the reaction force of blowing air during an operation is mostly received with the whole body of an operator via the frame 10. Therefore, fatigue in the arm during an operation can be reduced sufficiently.

During an operation, the grip 13 is operated to perform the operation while changing the direction of the blowout port 4A. Since the weight of the blower body 3 is supported by the frame 10, the direction of the blowout port 4A can be changed with a light operation, and a comfortable operation can be performed stably.

The grips 13 on the right and left are each provided with the operation input part 13A. By operating the respective operation input parts 13A, the rotation speeds of the electric motors 5 within the right and left blower bodies 3 can each be controlled independently. The controller 14 may be provided separately to each blower body 3 or may be provided to the frame 10 such that each electric motor 5 can be controlled separately.

In the case of blowing fallen leaves or the like with the blower tube 4 of a one-tube type, the fallen leaves or the like are spread to the right and left from the center of an air flow, and an operator has to move to the right and left over and over to blow and gather the spread fallen leaves or the like. However, with the employment of the blower tube 4 of a two-tube type, the blow operation device 1 of this embodiment can suppress the spreading of fallen leaves or the like by causing air flows to be blown simultaneously toward the center from the right and left and can significantly improve the operational efficiency of a blowing-and-gathering operation. The right and left blower bodies 3 are capable of independent output adjustments, and therefore increasing the efficiency of an operation and power saving are possible through an adjustment in accordance with the environment or situation of the operation.

Since the right and left blower bodies 3 are supported to the frame 10, the burden on both arms is made small even in the case of performing a blowing-and-gathering operation with a two-tube type, and the right and left grips 13 can be operated as appropriate to proceed smoothly with the operation.

Figure 4:
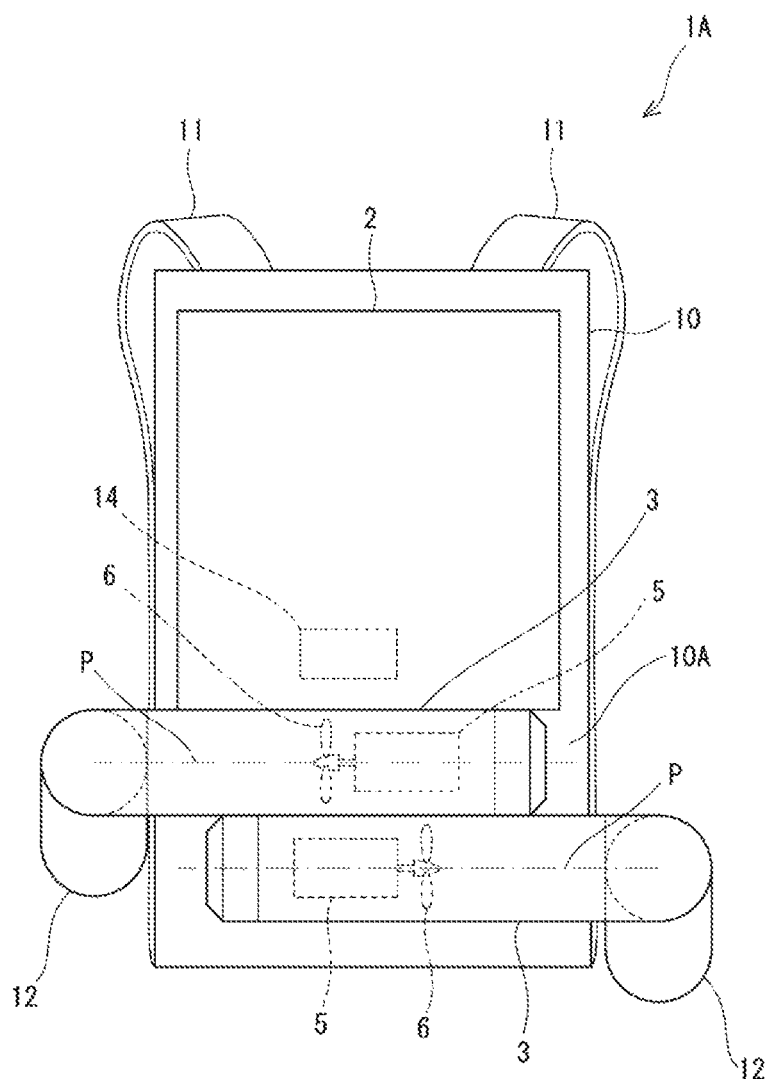
FIG. 4 is an illustrative view showing a blow operation device according to another embodiment of the present invention.

A blow operation device 1A shown in FIG. 4 is a modified example of the example shown in FIGS. 1 to 3. In this example, the drive axis P of the blower body 3 is lateral and along the back contact surface 10A of the frame 10. In the example shown in the drawing, the pair of right and left blower bodies 3 and the pair of right and left blower tubes 4 are disposed in parallel with the battery 2. In a lateral disposition with blowing directions in the opposite directions of each other, the two blower bodies 3 are attached to the lower part of the frame 10. The battery 2 is arranged above. With such an example as well, in a similar manner to the example described above, heavy objects attached to the frame 10 can all be made close to the back of an operator, and an operation can be done in a state where the burden of heavy weight carried on the back is greatly reduced.

Figure 5:
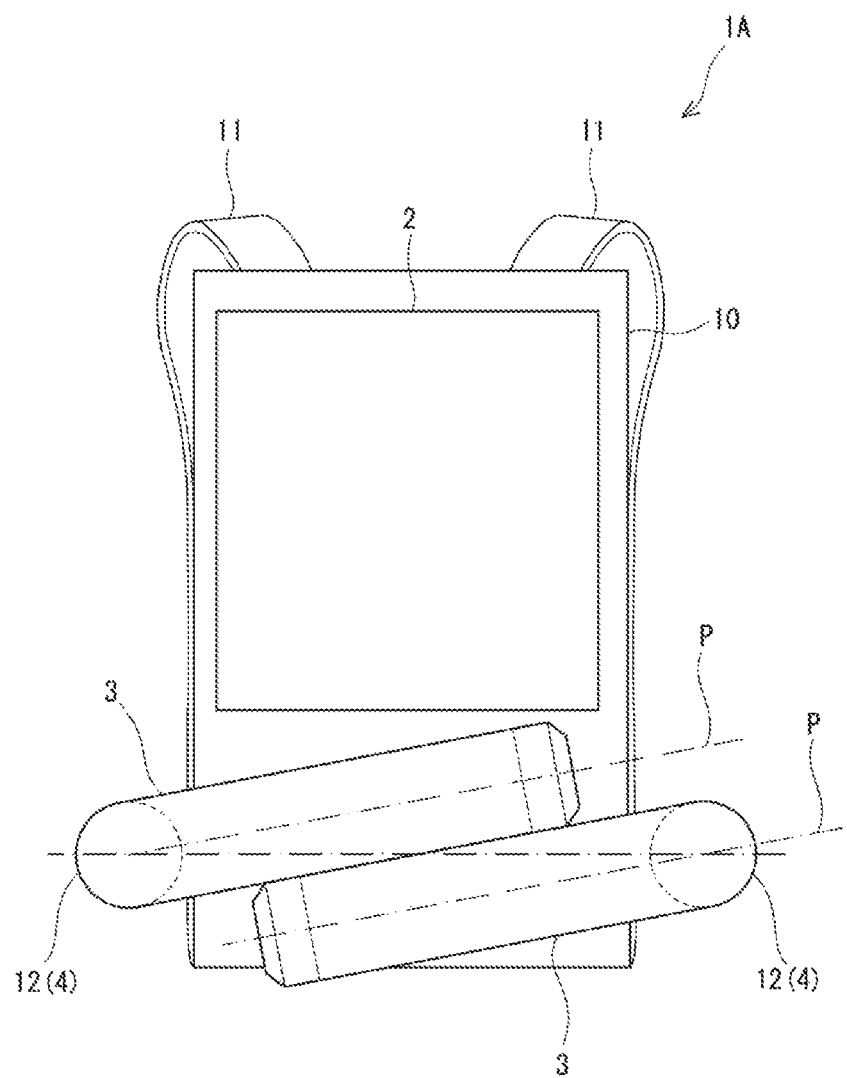
FIG. 5 is an illustrative view showing a blow operation device according to still another embodiment of the present invention.

An example shown in FIG. 5 is a modified example of the example shown in FIG. 4. The drive axes P of the pair of right and left blower bodies 3 are disposed diagonally with respect to the perpendicular, and the heights of the right and left blower tubes 4 are made identical. As in this example, the right and left blower bodies 3 may be inclined with respect to the perpendicular as appropriate. By making the heights of the right and left blower tubes 4 identical, the operability of the right and left blower tubes 4 improves.

As described above, the blow operation devices 1 and 1A according to the embodiment of the present invention can reduce the burden of heavy weight and can reduce fatigue in the arm of an operator. Further, the direction of the blower tube 4 can be changed freely to perform an operation with a favorable operability.

In the embodiments described above, the blower body 3 may be configured to be detachable with respect to the frame 10. In this case, selection of a one-tube type or a two-tube type and, in the case of a one-tube type, selection of one of right and left positions in the frame 10 as a connecting position for the blower body 3 may be allowed to allow for both right-handed use and left-handed use.

The embodiments of the present invention have been described above in detail with reference to the drawings. The specific configuration is not limited to these embodiments. Changes and the like in design that are made without departing from the gist of the present invention are included in the present invention. In the embodiments shown in the respective figures described above, it is possible that described contents are combined with each other, unless there is a particular inconsistency or problem in an object, configuration, or the like. The described contents for the respective figures can each be an independent embodiment. The embodiment of the present invention is not limited to one embodiment combining the respective figures.

EXPLANATION OF REFERENCE NUMERALS

1, 1A Blow operation device
2 Battery
3 Blower body
3A Intake port
4 Blower tube
4A Blowout port
5 Electric motor
6 Axial fan
10 Frame
10A Back contact surface
10B Attach member
11 Backpack harness
12 Bending hose
13 Grip
13A Operation input part
14 Controller
15 Signal cable
16 Flexible hose (bellows hose)

What is claimed is:

1. A blow operation device comprising:
a backpack type frame;
a battery attached to the frame;
a blower body having an electric motor to which power is fed from the battery and having an axial fan driven by the electric motor; and
a blower tube connected to a blow side of the blower body,
the frame including a back contact surface, and the blower body being attached to the frame such that axial directions of the electric motor and the axial fan are along the back contact surface, and
wherein a right and left pair of the blower bodies and a right and left pair of the blower tubes are provided.

2. The blow operation device according to claim 1, wherein the blower body is disposed in parallel with the battery.

3. The blow operation device according to claim 1, wherein the right and left blower tubes are attached at an identical height.

4. The blow operation device according to claim 1, wherein the battery is disposed between the right and left blower bodies.

5. The blow operation device according to claim 1, wherein a gravity center of the battery and an axis of the blower body are at an identical distance from the back contact surface.

6. The blow operation device according to claim 1, wherein the blower tube is connected to the blower body via a flexible hose.

7. The blow operation device according to claim 1, wherein the blower tube is provided with a grip that changes a blowout direction of the blower tube.

8. The blow operation device according to claim 7, wherein the frame or the blower body is provided with a controller that controls a rotation of the electric motor, and the grip is provided with an operation input part that inputs an operation signal to the controller.

9. A blow operation device comprising:
a backpack type frame;
a battery attached to the frame;
a blower body having an electric motor to which power is fed from the battery and having an axial fan driven by the electric motor; and
a blower tube connected to a blow side of the blower body,
the frame including a back contact surface, and the blower body being attached to the frame such that axial directions of the electric motor and the axial fan are along the back contact surface, and
wherein a gravity center of the battery and an axis of the blower body are at an identical distance from the back contact surface.

10. A blow operation device comprising:
a backpack type frame;
a battery attached to the frame;
a blower body having an electric motor to which power is fed from the battery and having an axial fan driven by the electric motor; and
a blower tube connected to a blow side of the blower body,
the frame including a back contact surface, and the blower body being attached to the frame such that axial directions of the electric motor and the axial fan are along the back contact surface, and
wherein the blower tube is provided with a grip that changes a blowout direction of the blower tube.

* * * * *